United States Patent [19]
Wernicki

[11] Patent Number: 5,412,303
[45] Date of Patent: May 2, 1995

[54] METHOD AND APPARATUS PROVIDING MINIMAL POWER CONSUMPTION, INDICATION OF SAVINGS AND FAULT DETECTION

[76] Inventor: Paul F. Wernicki, 211 Preston Ave., Suite D, Erie, Pa. 16511

[21] Appl. No.: 18,748

[22] Filed: Feb. 17, 1993

[51] Int. Cl.⁶ .................................................. H02P 1/24
[52] U.S. Cl. ................................. 318/729; 318/798; 318/800; 318/806; 318/438
[58] Field of Search ............... 318/729, 798, 800, 806, 318/438

[56] References Cited

U.S. PATENT DOCUMENTS

| | | | |
|---|---|---|---|
| 4,413,217 | 11/1983 | Green et al. | 318/729 |
| 4,454,462 | 6/1984 | Spann | 318/729 |
| 4,680,525 | 7/1987 | Kobari et al. | 318/798 |
| 4,727,305 | 2/1988 | Muskovac et al. | 318/798 |
| 4,800,326 | 11/1989 | Unsworth | 318/729 |
| 5,148,093 | 9/1992 | Bando et al. | 318/798 |

*Primary Examiner*—William M. Shoop, Jr.
*Assistant Examiner*—Karen Masih
*Attorney, Agent, or Firm*—Richard K. Thomson

[57] ABSTRACT

A power control circuit for induction motors wherein a servo loop is used to control power input by controlling the minimal power consumption of motor operation. The minimum power consumption is measured by sensing current or power and operating the servo loop at or near a minimally sensed power consumption level. The negative derivative of power consumption vs voltage curve, dP/dV, is sensed and a minimal value is used in a servo loop's error summing point wherein compensating slightly drives the power consumption point past the minimal power consumption point to regulate minimal power consumption by a smooth, minimal cycle. Maximum energy savings is thus attained with a smooth, stepless regulating method placing no mechanical stress on the motor-and-load combination. An indicator of power savings and normal operation is inherent in this type of control system which provides for a device for both indicating the level of savings and alerting of system faults. A circuit timer may be included to provide intermittent operation of refrigeration/air conditioning units to provide additional energy savings for these systems.

8 Claims, 3 Drawing Sheets

METHOD AND APPARATUS PROVIDING MINIMAL POWER CONSUMPTION, INDICATION OF SAVINGS AND FAULT DETECTION

FIELD OF THE INVENTION

The present invention relates to fractional and integral horse power, single and three phase motors in any application with generally smooth, slowly varying loads with occasional step-changed conditions. In particular, refrigeration and air conditioning compressors, pumps of all sorts, and machine tools represent a large percentage of applications of motors whose loads can vary over a range from light to full load, but operating generally in a constant or slowly varying condition. More particularly, this invention is directed to a servo controller with a unique feedback scheme comprised of the fewest possible components which serves to produce maximum energy savings by minimizing motor electrical energy consumption in such constant usage applications and provides both indication of energy savings and fault conditions.

BACKGROUND AND SUMMARY OF THE INVENTION

Ever since the oil embargo and resulting energy crisis of the late 1970's, America has been striving to develop the highest degree of energy independence possible by stressing the need for conservation of our natural resources. Greenpeace has been instrumental in focusing attention on the threat, real or imagined, of the "green house effect", which has also spurred efforts to reduce energy consumption. Much quantitative data has been generated documenting the tremendous potential energy savings with induction motor energy conservation schemes described in several previous patents.

Interest in this technological area was initially spurred on by NASA's Tech Brief entitled "Improved Power-Factor Controller" and resulting U.S. Pat. No. 4,266,177 issued to Nola. The research giving rise to the paper and patent documented power savings for a broad line of induction motors from ⅓ to 5 horse power of both single and three phase varieties. Subsequent research efforts have demonstrated that power savings schemes different from those developed by NASA can produce similar levels of savings.

The power factor controller developed by NASA is, unfortunately, only a power factor controller and does not maximize power savings. While there is a strong correlation between power factor control and energy savings, significant potential savings may be unrealized in many instances since minimization of power will not occur in a control scheme that sets a specific operation phase angle rather than an optimal varying point. This latter more beneficial control is available with a load-feedback-driven servo controller of the type described herein incorporating a unique feedback scheme. Other problems may arise with a set point phase-angle controller in that all operating conditions may not have been considered when setting an operating point, and insufficient voltage may be provided to the motor at critical times which can cause system operational problems, excessive energy consumption or even product failure. Compensation for such problematic situations requires detuning of such phase-angle controllers which always result in reduced operational improvements; so, predicted, published results are not realistically obtainable for NASA's invention when utilizing existing prior art systems. U.S. Pat. No. 4,413,217 points this out when it states, "However, it is known that such full load phase lag varies for each motor and should be set on the controller in accordance with the specific motor being utilized."

Other U.S. Pat. Nos. 4,806,838 issued to Weber and 4,413,217 issued to Green et al., each teach the use of power factor controllers and use multiple feedback signals to accomplish their power savings improvements. The circuits described in these patents are quite complicated, require many components, and only marginally improve, rather than maximize, power factors characteristics and some energy savings. Another invention discussed in U.S. Pat. No. 4,477,761 presents a circuit of larger complexity using multiple feedback signals, and steps through regulating minimum power consumption in a bang-bang servo. This could result in nuisance, audible noise variation when going from speed to speed, as with other stepped controllers, including the power factor controllers. Another disadvantage of such stepping controllers is that the time lag between steps can actually cause the loss of some operating efficiency improvement because time-varying parameters will have changed prior to the implementation of the next step. U.S. Pat. No. 4,333,046 refers to a 3-phase system using only two power factor controllers to effectively reduce a portion of the equipment cost of a 3-phase system using three controllers by one-third. Such a system would benefit from using the embodiment of this invention by providing optimum energy savings, as well as from the other benefits of the present invention.

Stepping controllers of the type used in the prior art can introduce mechanical stress in the form of torque pulsations resulting from the sudden change of applied voltage during stepping. This mechanical stress results in wiping film lubrication from bearing and shaft surfaces. This film wiping reduces bearing life and consequently the life of the motor and load it is driving.

In the present invention, the disadvantages of a set point controller are overcome by a true load-driven feedback servo controller system, thereby providing optimal tuning, maximum savings, and improvement throughout the operating range from no load all the way to full load. The use of a true load-driven feedback servo controller delivers operational improvement in energy consumption reduction even at full loading because electrical power utilities provide for ±10% voltage variation in supplied user voltage, which implies a system will work all the way to −10% nominal voltage. It can, therefore, be inferred that there is an excess of 10% operation voltage applied to a motor at nominal operating voltage, and it is this potential 10% reduction in operating voltage that may be targeted by a load-driven feedback servo controller, thereby allowing for energy consumption reduction all the way to full loading of a motor. This true load-driven feedback servo controller approach can be applied to any type of energy conservation system, including series triac voltage reduction systems like this invention discusses, variable-voltage transformer drive systems, and systems detailed in the prior art patents described herein.

Specifically, this invention has been applied to a variety of motors in the same horse power range discussed in the NASA Tech Brief and significant savings have been demonstrated throughout the range from no load to full load, on motors of all sizes. The single most important feature of this invention is that the regulation is completely automatic, and that maximum savings and satisfactory operation of motors is achieved over the complete motor operating voltage and load ranges. This is because the automatic minimum power consumption circuit forces continuous improvement even at full load. No sacrifice is required as is the case with NASA's power factor controller and others and there is always some improvement, a minimum of 2% having been demonstrated by empirical tests.

This power saving circuit is intended for passive, unidirectional power transmission, and as such, must supply positive power every half cycle of applied power. A common error in most power factor controllers and power savers is to supply two or four quadrant (or regenerative circuits) to fire the triac. This may be intentional, but is believed to usually be an unintentional result of misunderstanding firing and ramp generating circuits. A load on a motor is generally constant, which reflects a minimum applied voltage required to a motor. Phase controlling any of these controllers from 0° to 180° will negate this requirement and will, in fact, cause the load to overhaul the motor and cause the motor to slow down, vibrate or even stall. This is one of the biggest problems with all of the prior art controllers, and is eliminated by reducing the maximum phase shift in the firing circuit (or firing delay) to a value that can be calculated from system operating characteristics.

For this power saver, nominal line variations of ±10% produces the following result: If a motor is running with +10% applied nominal voltage, and the motor-load combination will run satisfactorily at −10% applied nominal voltage, the maximum reduction available would be −20% applied voltage. To accommodate transients, stepped load changes, etc., control systems engineering standards dictate twice that value for proper feedback controller operation. Therefore, 40% reduction in applied voltage is all that is required for proper controller operation. Providing a nominal increase in phase delay would increase 40% slightly, but generally not above 50% (i.e., provide a safety factor). This minimizes the firing phase delay from 0° to 90° delay, maximum. Because of this, an accommodation must be made in the ramp generator, timing summing point to force firing of the triac at no later than 90° phase delay. This will cause smooth, continuous, maximum power savings 100% of the time with no controller or motor malfunction or failures, which are common with other phase angle or power savings controllers.

Eventually, though, every man-made mechanical device will wear and start to fail, including any motor driven by the controller of this invention. As a device starts to wear, fail, or experience other problems, such as worn bearings, the feedback of this invention starts to pulse or vary outside predetermined limits and begins to fully fire the triac, or what ever control means is utilized, and effectively no voltage reduction occurs, for short periods of time initially, or continuously, as more wear develops. This inherently produces full voltage firing which is similar to that which occurs when a transient or step change in load occurs in this other systems. The integrated error amp in this controller will saturate and cause the firing circuit to fully fire, to ride through the momentary overload by supplying full line voltage for a few seconds. If the overload is maintained because of wear or other problems, the error amp becomes continuously saturated and fully fires the controller indefinitely.

The present invention is equipped with a light or some signaling device which can be driven when predetermined voltage levels occur above and below a preset value across a voltage limiting device driven by a servo controller. Most preferably, a dual color light-emitting diode of red and green is used, red signaling no savings or a problem, and green indicating savings and a well operating servo controller and motor. Typical problems that can be indicated by such a red/green LED include the full firing operation referenced above or, in the case of a refrigeration/air conditioner unit where low freon will cause a compressor to surge or pulsate. Problems such as these will result in a voltage value below the threshold voltage thus activating the red color of the signaling LED. In actuality, any motor-driven load system problem that causes the feedback to become saturated or unstable will cause the firing circuit of a servo controller built to the criteria of this invention to signal red in a red/green LED signal indicator.

It is among the objects of this invention to provide a simpler and more efficient system, that is, one requiring fewer components, minimizes energy consumption, reduces mechanical stresses, and prolongs the life of the motor and load it drives. Also among the objects is the desire to provide a signaling means to indicate energy savings and potential fault conditions in either the motor or the load driven by that motor. Further, it is among the objects of this invention to describe a compressor cycling system to decrease operating costs of refrigeration/air conditioning equipment by up to 50%.

In accordance with this invention, a minimal energy consumption power controller is constructed wherein the negative derivative of either current or power with respect to voltage applied to a motor is measured by a feedback current (or power) sensor; amplified; filtered; converted to a representative voltage; and compared to a reference bias voltage of opposite polarity, proportional to the value of the negative derivative by an integrating error amplifier; and synchronously compared to a zero voltage initiated, ramp-generated signal to produce a train of firing pulses to a triac (or other voltage regulating device). The firing pulses to the triac are therefore synchronously timed to deliver a delayed turn-on command in a servo controller and provide a smooth, reduced level of voltage to a motor. This has the effect of minimizing the power input to said motor. An indicator is also provided to indicate this power reduction and also warn of potential faults with either the motor or load to which the motor is connected.

Additional features, advantages and characteristics of the present invention will become apparent after a reading of the following detailed description.

DETAILED DESCRIPTION OF THE INVENTION

Figure 1:
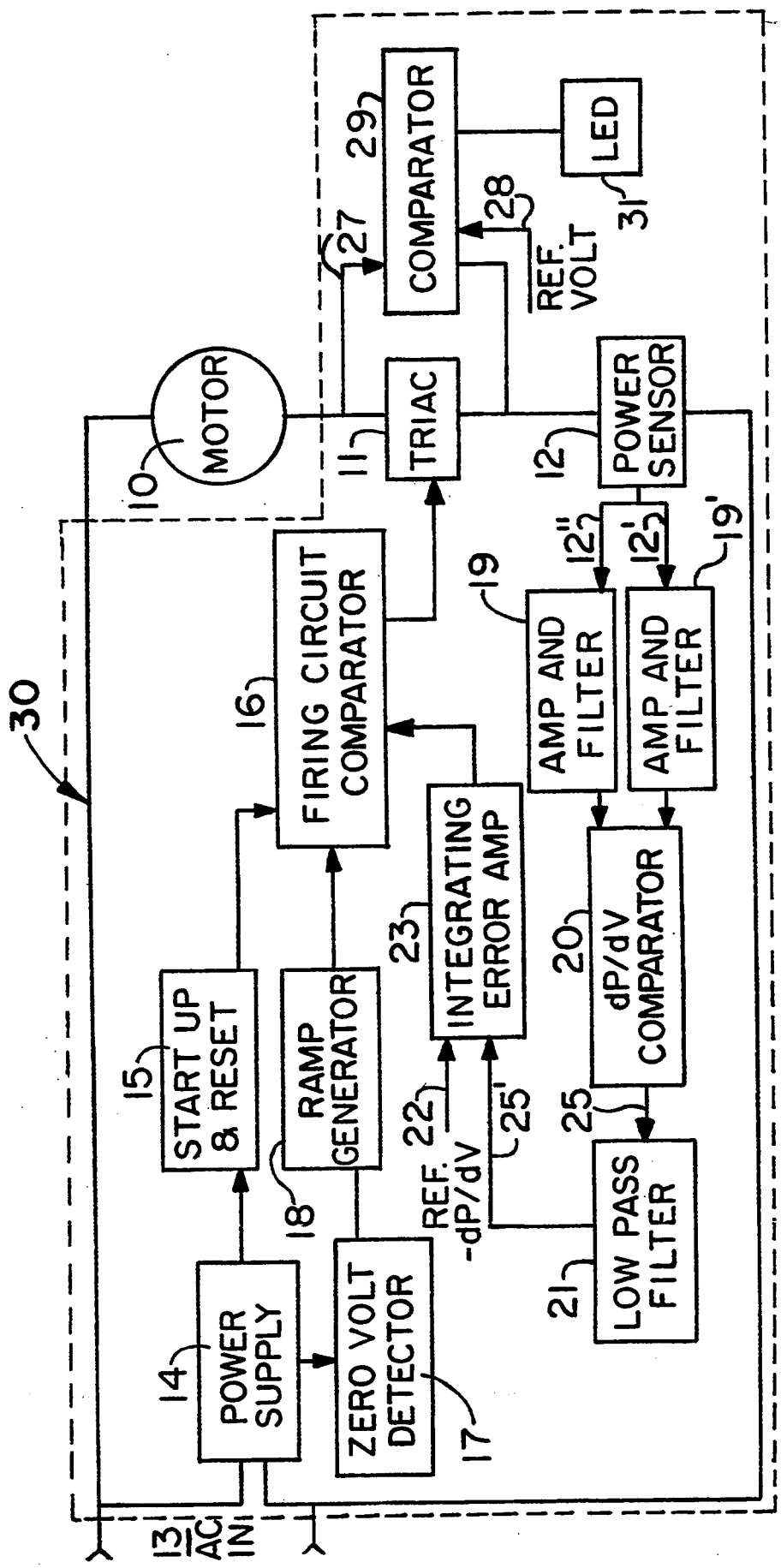
FIG. 1 is a block diagram of the circuit of a first embodiment of the present invention.

Referring to FIG. 1, an AC induction motor 10 is powered by an AC input source 13. The AC input power passes to motor 10 through the control of a triac 11 connected in series with the motor and power sensor 12, all three of which are connected across the AC source. While triac 11 is the preferred switch mechanism, it will be appreciated that various known alternatives may be used with equal success. The triac 11 is triggered during controlled portions of each half cycle of AC power input to regulate the amount of power delivered to the motor.

Common practice on start up of a motor is to initiate start up with 100% voltage to insure proper start up of both the motor and the load to which it is connected. Additionally, with power sources that have voltage drops or momentary outages, for example, lighting systems, it is necessary to follow these momentary drops with application of 100% voltage to insure proper, continuous operation of the device. In the present circuit, this is accomplished in the servo controller 30 by a startup and reset signal 15 applied to the firing circuit comparator 16 which turns the triac 11 full on for a few seconds. This signal is derived from within a power supply 14 in the servo controller 30 which constantly monitors the AC input power from source 13 and supplies the necessary power to the servo controller 30.

Figure 3:
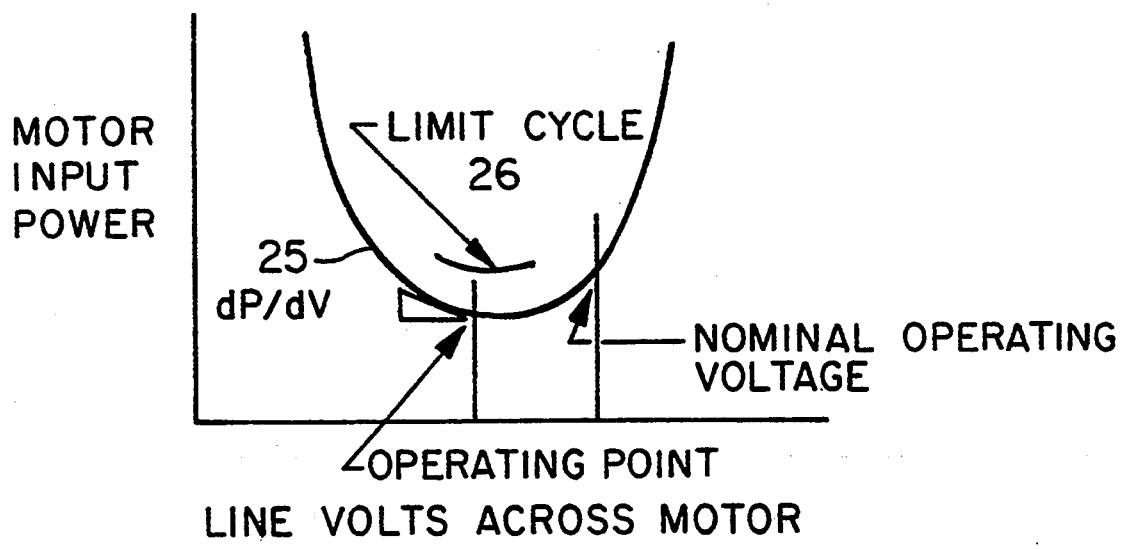
FIG. 3 is a plot of motor input power vs voltage demonstrating the power minimization features of the present invention.

Once the motor is powered up with 100% voltage and is up to speed, the servo controller 30 takes over controlling the motor power consumption through the use of a power sensor 12. This sensor 12 supplies the servo with a feedback signal conditioned through an amplifier and low pass filter 19 which is used to regulate minimal power consumption by the motor 10. It should be noted that, alternatively, a current sensor can be used in place of power sensor 12 which is, in fact, common practice as current sensors are much less expensive, and much easier to use. The representative operational parameter (power or current) shall be designated 'R'. The power or current signal value is then converted to a dP/dV signal 25 (referring to FIG. 3), signal 25 is processed by low pass filter 21 producing signal 25', which is the actual feedback signal used in the summing junction of the integrating error amp 23. The dP/dV signal 25 is derived by comparing the ratio of proportional value of instantaneous 12' and average 12" values of power used by the motor. These values are sensed by a sensor 12, (or current is sensed and used to compute power) amplified and filtered by filters 19 and 19' respectively, and processed by comparator 20 to produce a DC voltage 25 representative of dP/dV.

To accommodate design constants and characteristics of the motor and its load, this feedback error signal is passed through a low pass filter 21 before it (25') is sent to the error amp 23. This allows for a smooth, noiseless, non-stepping, and vibrationless signal conditioning of the feedback power signal, the reference dP/dV signal 22 that the feedback signal is compared to is simply a nominal voltage which can be a variable voltage (of opposite polarity) derived from a reference potentiometer (not shown) across the power supply. A characteristic of the integrating amplifier 23 is that it provides for a smooth, fairly constant, reduced-voltage (phase-delayed) firing signal from the firing circuit comparator 16 to the triac 11. With proper selection of filtering components in the aforementioned low pass filter 21, minimum power can be sensed and regulated to the motor with minimal limit cycle characteristics of motor speed regulation and power consumption. Timing for firing of comparator 16 is provided by zero volt detector 17 which provides a reference signal to ramp generator 18 each time the AC voltage source 13 cycles through zero. Ramp generator 18 then provides a pulse to comparator 16 where it is used to time the firing of the comparator 16, while signal 25' determines the magnitude of the resultant signal. Controller 30 iteratively compares the power requirements of the system to the power delivered and reduces the delivered power to the minimum necessary to operate motor 10 and its associated load.

Figure 2:
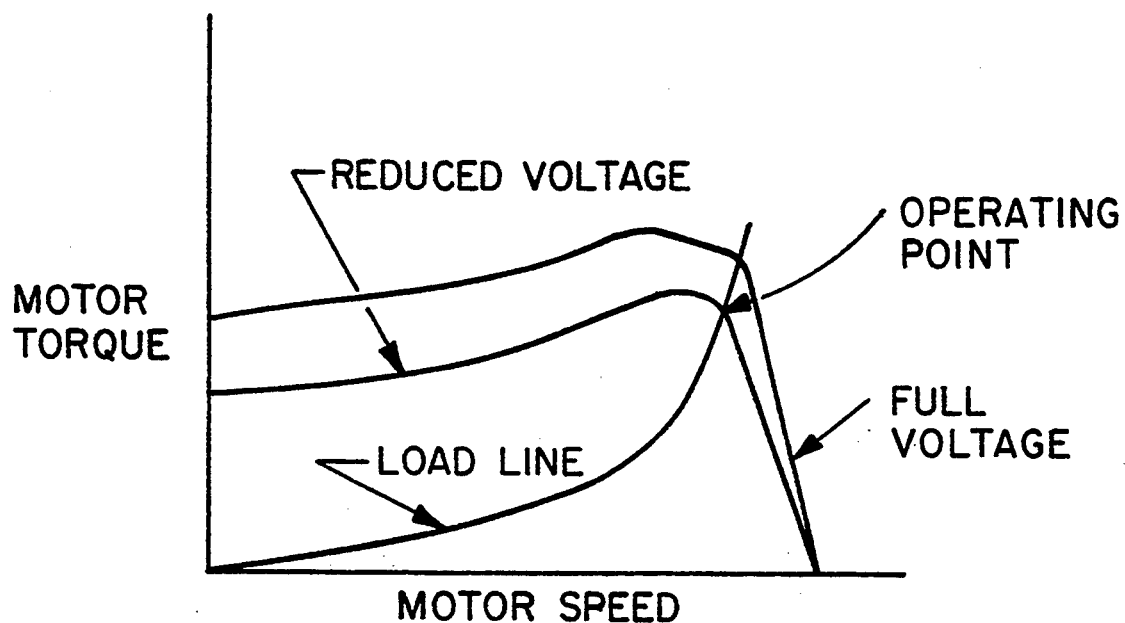
FIG. 2 is a plot of motor torque vs motor speed illustrating the operating characteristics of the present invention.

Because of a high sensitivity of this circuitry to dP/dV, a regenerative circuit is not required with this single negative derivative servo controller to accommodate step changes in load, as with other patented devices discussed in this application. This is because the power and derivative dP/dV increase sharply with an instantaneous step change, so much so that the integrating error amplifier saturates and causes the firing circuit to full fire the triac 11. Referring to FIG. 2, the intersection of the load line and motor speed-torque curve illustrates this fact because at this operating point, the motor tends to rapidly slow down or stall, or conversely, a great increase in current occurs to provide a high dP/dV signal, with properly chosen filter components. In many instances, the start up and reset signal 15 will not always have to be used due to this high increase in power and dP/dV signal, but is used only to insure positive full firing of the triac 11 for a few seconds at startup and following long duration power drops.

Figure 4:
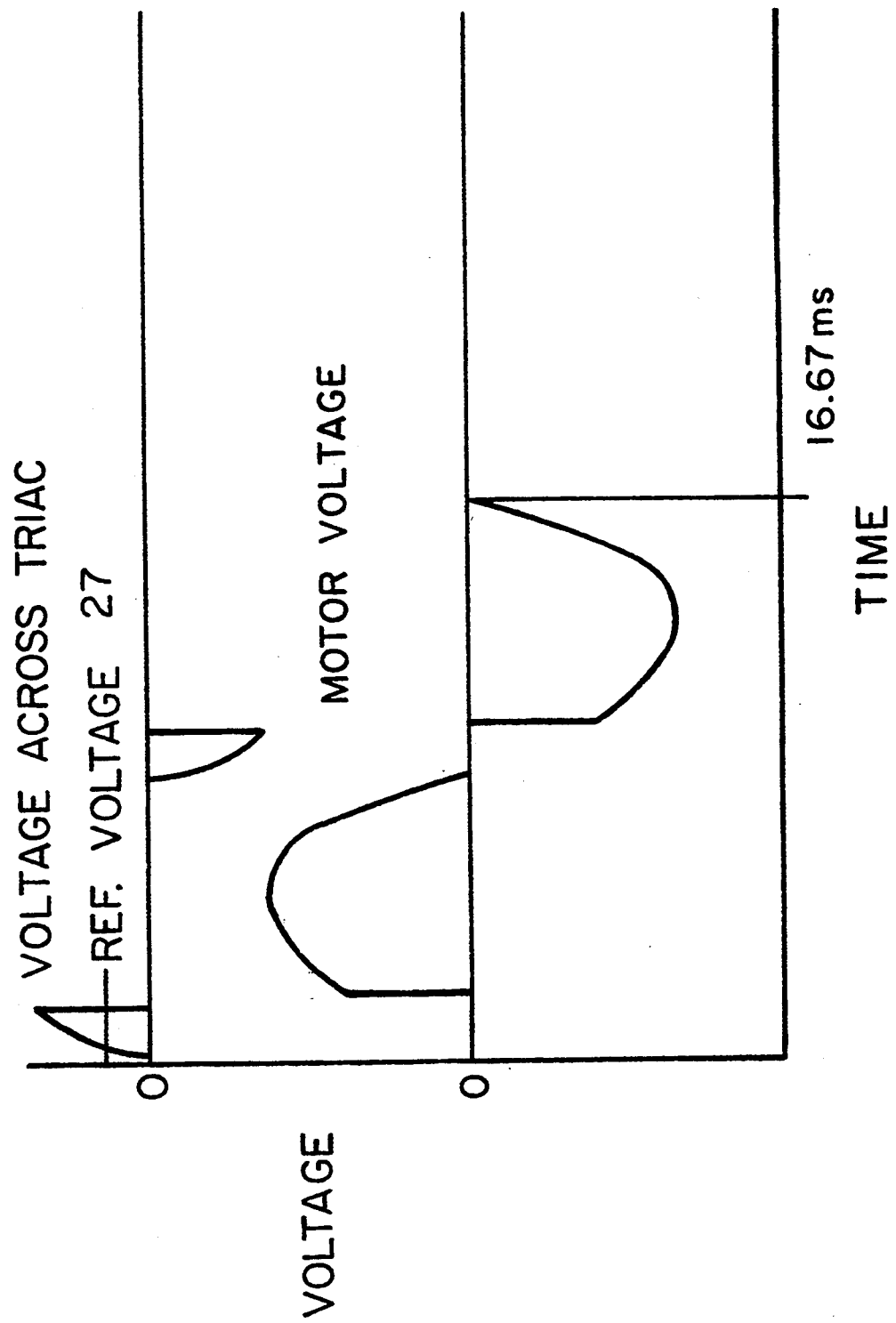
FIG. 4 is a plot of the voltage wave forms across select circuit elements.

A controlled limit cycle 26 (FIG. 3) that can be sensed can provide an operational indicating signal which is derived from the characteristics of the low pass filters in the dP/dV circuitry. When motor loads are excessive, bearings are worn, load characteristics of the motor load are deviated from normal (as with an air conditioner low on freon), or any other problem that may occur, the error signal at the summing junction of the integrating error amp 23 becomes so unstable that it saturates the error amp 23. This saturation causes the firing circuit to turn the triac to full on. This voltage 27 across the triac 11 can be compared to a reference voltage 28 (FIG. 4) in comparator 29 to indicate a high or low signal. The servo controller will always reduce the voltage to the motor 10 at nominal line voltage (because of ±10% AC power headroom), so there is a minimum voltage across the triac 11 that can serve as reference voltage 27. The output of comparator 29 is used to trip a bi-directional LED 31 into one of its two modes indicated by a red or green light. A low signal (red light) would represent no power savings or systematic problems if the minimum reference voltage 28 was not reached across the triac 11. A high signal would indicate power savings and a properly operating system when a minimum voltage 27 across the triac 11 exceeds the reference voltage 28.

The savings potential of this load-driven feedback servo controller 30 has been demonstrated by testing it against the results shown in FIG. 2 of the referenced NASA Tech Brief, which is hereby incorporated by reference. Controller 30 of the present invention compared favorably for all motors tested, indeed, showing superior results of 20% savings at loads up to 40% torque load for the ⅛ HP motor. It will be recalled that real world problems typically prevent the full benefit of the savings predicted by the NASA circuit. The present invention overcomes those difficulties and makes the full savings realizable and, in some cases, provides additional savings.

A condition unique to refrigeration/air conditioning units is that running at full speed is not required and, in fact, is usually undesirable. The ±10% line voltage operating characteristics of commercially available compressors decreases their efficiency by increasing operating pressures and temperatures for many design parameters. From the Carnot cycle equation, system efficiency is proportional to the difference in evaporator and condenser temperatures. As such, when there is increased voltage or compressor pressure head room, efficiency starts to drop dramatically. For example, a system with operating evaporator and condenser temperatures of 50° and 110° F., has a temperature difference is 60°. A 10° change in evaporator and condenser temperatures to 40° and 120° results in a temperature differential of 80°; this results in a dramatic loss of efficiency of 30% for many design parameters. This can result from two different scenarios which are typical in commercial and residential refrigeration/air conditioning equipment. The first is by excessive voltage being applied to the motor which forces compressor pressures to change to give a pressure differential which will result in a temperature differential as described above.

The second way for this to happen is with decreased air flow across the evaporator and condenser coils which allows the temperature differential to decrease, again, as described above, resulting in a potential 30% efficiency reduction. Both of these scenarios can combine to produce a result in a vector summation of efficiency loss which can approach 50%. These maximum 50% savings will add algebraically to the typical 2 to 20% savings available with the servo controller. Laboratory tests have confirmed this predicted result. For example, even nominal operating voltage applied to a small commercial window type room air conditioner running in low fan speed actually causes the whole unit to consume the same amount of energy as when it is operated in high. This results in half the cooling for the same operating costs, in low as compared to running in high (or, conversely, twice the operating cost of running in low).

A method to reduce operating costs by up to 50% in the above described test is to operate the compressor only 50% of the time and allow the fan to run usually 100% of the time for comfort considerations. This results in an additional increase in efficiency by taking advantage of the residual cooling effect of the evaporator and condenser coils. This approach is contrary to present practice which uses variable speed control on fan motors which produce dramatic reduction in cooling efficiency compared to the paltry few percent savings in fan operating costs.

The firing circuit comparator 16 in FIG. 1 may optionally be equipped with an on-off repetitive cycling timer which, when activated, turns the compressor of the refrigeration unit on for a minimum of three minutes and off for a minimum of three minutes. Commercial manufactured compressors require a minimum of three minutes, typically, for off times to permit system equalization to occur. This allows pressure equalization to allow low torque starting compressors to start reliably. Preferably the circuit will include a safety delay timer for compressor motors with low starting torque. This delay timer will ensure restart after the off cycle. This 50% on and off will allow for a maximum of approximately 50% energy consumption savings. For systems with lower maximum capacity or higher load requirements, this 50% timing on and off can be adjusted to any desired on-off ratio with the requirement that "off" be a three minute minimum. Conversely, "on" time may be increased to produce required enhanced system performance.

Special consideration for high humidity areas may require that on times be longer to allow evaporators to convert high humidity to water by condensation. This can be accomplished by periodically running the compressor for longer periods of time or setting up any form of exotic timers to have variable, or off timing control with any variety of on-off time periods to suit the particular application.

The savings warning indicator 31 works with the aforementioned feature as follows: when the compressor is off, savings are being realized because no compressor energy is being consumed and the triac voltage 27 in the off state will supply the correct signal. When triac firing circuit comparator 16 is enabled by the on-off timer, the operating characteristics of the motor and compressor 10 will reflect themselves in the power saving feedback circuit, and appropriate savings and warning signals are applied to the indicating device 31. The red light will light for only a few seconds upon start up while the controller is stabilizing.

Various changes, alternatives, and modifications will become apparent following a reading of the foregoing specification. For example, other schemes, digital computers, programmable controllers, etc., as well as analog computers (for which this controller was initially designed), are considered obvious variations, since the mathematical modeling described herein can be applied to those, and other schemes, as well. It is intended that all such changes, alternatives and modifications that fall within the scope of the appended claims will be considered part of the present invention.

I claim:

1. A load-driven, servo controller system for minimizing power consumption in small AC motors experiencing relatively slow-changing operating conditions, said controller having principal operating components which consist essentially of:

a) a power supply receiving input AC power from a source;
   b) a sensor for measuring a magnitude of an operational parameter R of said system;
   c) a system component for converting said operational parameter into a proportional voltage representative of a derivative of a corresponding power/voltage curve;
   d) low pass filter means for shaping said proportional voltage;
   e) an integrating amplifier for comparing the shaped proportional voltage to a preselected reference voltage;
   f) a zero volt detector generating a pulse each time said power supply voltage passes through zero;
   g) a ramp generator for converting said pulse into a timing signal;
   h) a firing circuit comparator for combining said shaped proportional voltage with said timing signal to produce a timed control signal;
   i) a triac triggered by said firing comparator to feed current to said AC motor;

whereby said servo controller iteratively compares said power requirements to power delivered and reduces the delivered power to the lowest level required and provides full voltage firing of said triac as needed without using a regenerative feedback circuit.

2. The servo controller system of claim 1 wherein said operational parameter R is selected from the group containing current and power delivered by said triac.

3. The servo controller system of claim 1 further comprising a display device to depict a presence of system faults and level of energy savings.

4. The servo controller system of claim 3 wherein said display device comprises a bi-directional light emitting diode.

5. A method of reducing energy consumption in small AC motors experiencing relatively slow-changing operating conditions including the steps of
   a) measuring a power-dependent operating parameter of a system for delivering power to said motor;
   b) computing a value of a slope of a power/voltage operating curve for said system;
   c) converting said slope value into a DC voltage representative of a magnitude of said value;
   d) comparing said value to a timing signal produced by a ramp generator connected to a zero voltage detector to produce a control pulse;
   e) feeding said control pulse to a triac to trigger delivery of power to said AC motor;
   f) iteratively repeating steps a–e to minimize the power delivered to the minimum level required by said system said minimum level being defined by an intersection of a reduced voltage curve and a load line on said motor's torque-speed curve.

6. A system for minimizing power consumption in refrigeration/air conditioning units said system comprising:
   a) a power supply receiving AC input power from a source;
   b) circuitry means for producing a control signal for activating a triac;
   c) an on-off repetitive cycling timer for shutting off said triac for off periods up to 50% of the time, said off periods being at least three minutes in duration.

7. The system according to claim 6 further comprising a delay timer to selectably delay at least one of on-cycling and off-cycling.

8. The servo controller according to claim 1 further comprising a circuit to provide a minimum applied power to said motor and its load to prevent stalling and possible failure, said minimum applied power being defined by an intersection of a reduced voltage curve and a load line on said motor's torque-speed curve.

* * * * *